United States Patent [19]

Kapton et al.

[11] Patent Number: 5,045,033
[45] Date of Patent: Sep. 3, 1991

[54] DUAL ARBOR SPINDLE

[75] Inventors: Kenneth Kapton, Verona; Barry D. Wixey, Pittsburgh, both of Pa.

[73] Assignee: Delta International Machinery Corporation, Pittsburgh, Pa.

[21] Appl. No.: 525,238

[22] Filed: May 22, 1990

[51] Int. Cl.$^5$ .............................. F16H 55/00
[52] U.S. Cl. .................... 474/197; 403/259
[58] Field of Search ......... 474/197, 166, 902, 903; 403/259, 260, 26

[56] References Cited

U.S. PATENT DOCUMENTS 2,429,293  10/1947  Peck et al. .............. 474/197 X
3,134,268  5/1964  Firth ........................ 474/197
3,267,758  8/1966  Poundstone ............ 474/197 X Primary Examiner—Thuy M. Bui
Attorney, Agent, or Firm—Merchant, Gould, Smith, Edell, Welter & Schmidt

[57] ABSTRACT

A solid, dual arbor spindle including a central cylindrical section creating a central pulley surface, a large arbor longitudinally extending from the central section in a first direction, and a small arbor longitudinally extending from the central section in a second direction diametrically opposed to the first arbor. The central section of the spindle is rotatably retained between a pair of bearings which are confined in position between a pair of interconnected retaining rings.

8 Claims, 3 Drawing Sheets

DUAL ARBOR SPINDLE

FIELD OF THE INVENTION

Broadly, the invention relates to spindles used in power tools to transmit rotational power from a motor to a cutting tool. More specifically, the invention relates to such spindles which facilitate the interchangeablility of arbors.

BACKGROUND OF THE INVENTION

Stationary power tools typically employ a spindle to transfer rotational power from the motor to a cutting tool mounted directly upon the arbor of the spindle.

One spindle design characterized by superior performance with respect to rotational vibration and run out comprises a pulley surface and an arbor machined as a solid unit. However, power tools frequently require the use of differently sized arbors to facilitate the use of variously sized cutting tools and such "solid" spindles complicate the procedure and exacerbate the cost of interchanging the arbors as the entire spindle must be replaced.

A second spindle design which facilitates interchangeability of the arbors is known as a "cartridge spindle". Cartridge spindles comprise a pulley surface with a central steel shaft capable of releasably retaining variously sized arbors. While cartridge spindles simplify the interchangeability of variously sized arbors, they lack the superior performance characteristics of the solid spindle design as they inherently suffer from substantial vibration and run out. In addition, the cartridge spindle are considerably more expensive to manufacture and maintain than solid spindles.

Accordingly, a substantial need exists for an inexpensive spindle capable of providing the superior performance characteristics of a solid spindle while permitting simple and easy interchangeability of arbors.

SUMMARY OF THE INVENTION

We have discovered a spindle design which combines superior performance with ready interchangeability of arbors. The new spindle design includes (i) a central section which defines a pulley surface, (ii) a first arbor extending from the central section in a first longitudinal direction, and (iii) a second arbor extending from the central section in a second longitudinal direction which is diametrically opposed to the first longitudinal direction.

The spindle is conveniently retained within a spindle housing which is operable for (i) rotatably retaining the spindle in proper orientation with respect to the work surface and the motor, and (ii) permitting the drive belt to operably contact the pulley surface of the spindle.

DETAILED DESCRIPTION OF THE INVENTION INCLUDING THE BEST MODE

Figure 1:
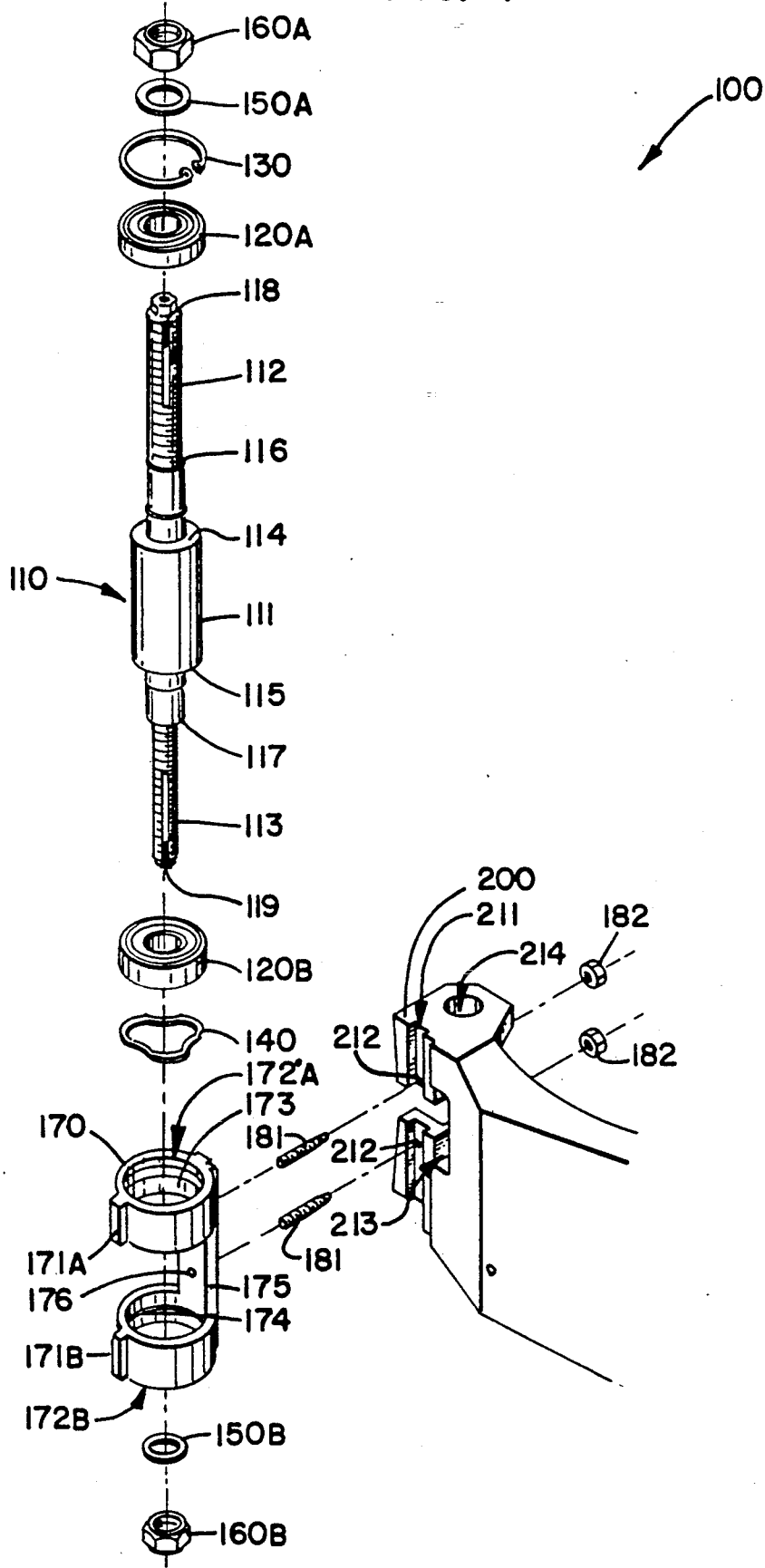
FIG. 1 is an exploded perspective view of one embodiment of the invention.

Nomenclature 100 spindle assembly
110 spindle
111 central section
112 large arbor
113 small arbor
114 first inner shoulder proximate large arbor
115 second inner shoulder proximate small arbor
116 first outer shoulder on large arbor
117 second outer shoulder on small arbor
118 longitudinal key slot in large arbor
119 longitudinal key slot in small arbor
120a first bearing
120b second bearing
130 retaining ring
140 wave washer
150a flat washer
150b flat washer
160a nut
160b nut
170 spindle housing
171a first retention ring
171b second retention ring
172a central orifice through first ring
172b central orifice through second ring
173 inner annular channel in first retention ring
174 inner annular flange in second retention ring
175 connecting brace
176 holes through connecting brace
181 bolts
182 nuts
200 bracket assembly
211 alignment channel
212 holes through spindle mounting portion
213 belt channel through spindle mounting portion
380 drive belt
920 work surface The dual arbor spindle is useful in connection with substantially any machine where superior operational performance and interchangeable arbors are desired. We have discovered that the spindle is particularly well suited for utilization in conjunction with a utility shaper. Accordingly, without intending to be limited thereby, the spindle will hereinafter be referenced with respect to utilization in conjunction with a utility shaper.

Construction

Figure 2:
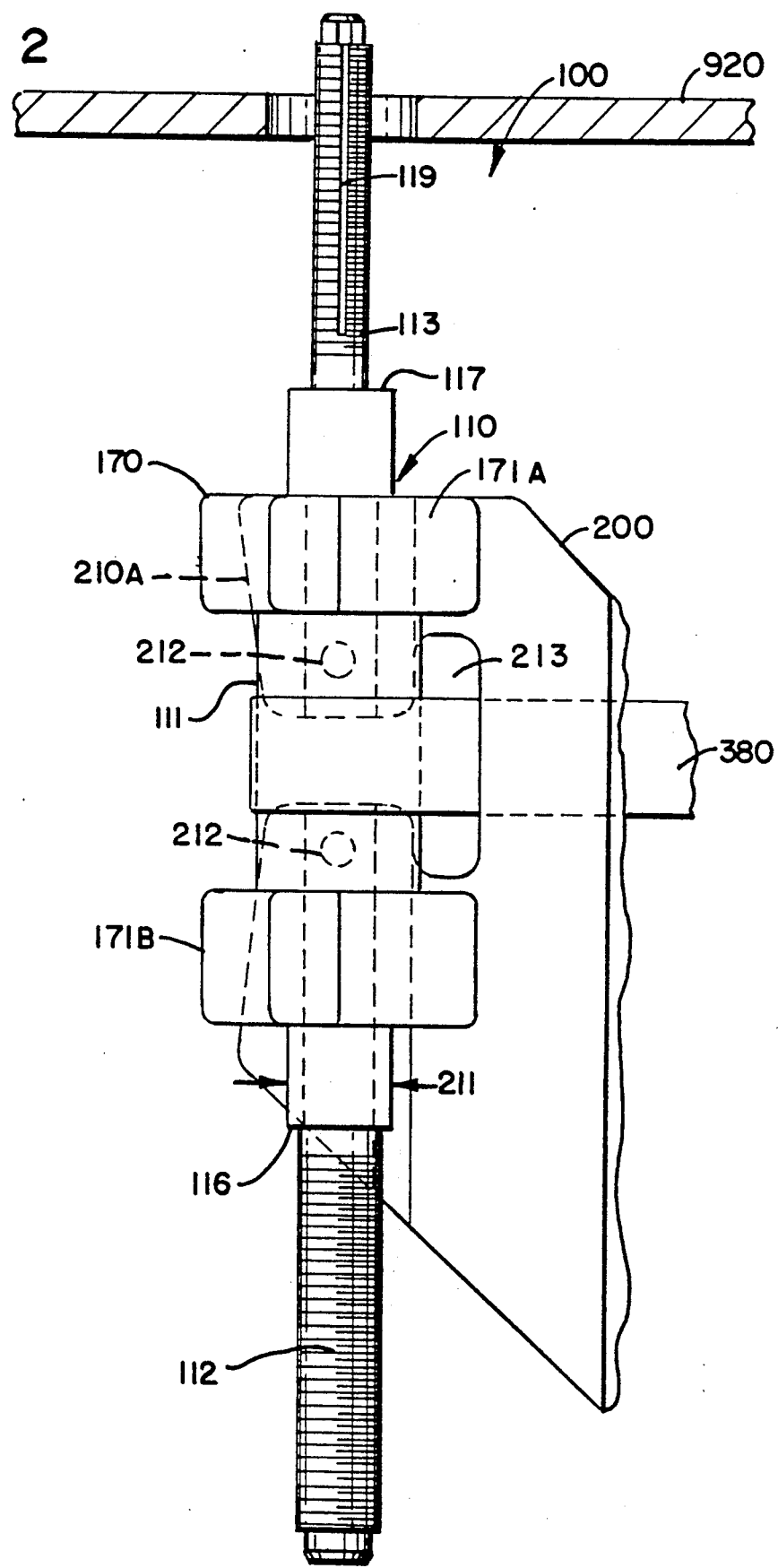
FIG. 2 is an assembled front elevational view of the invention depicted in FIG. 1.
Figure 3:
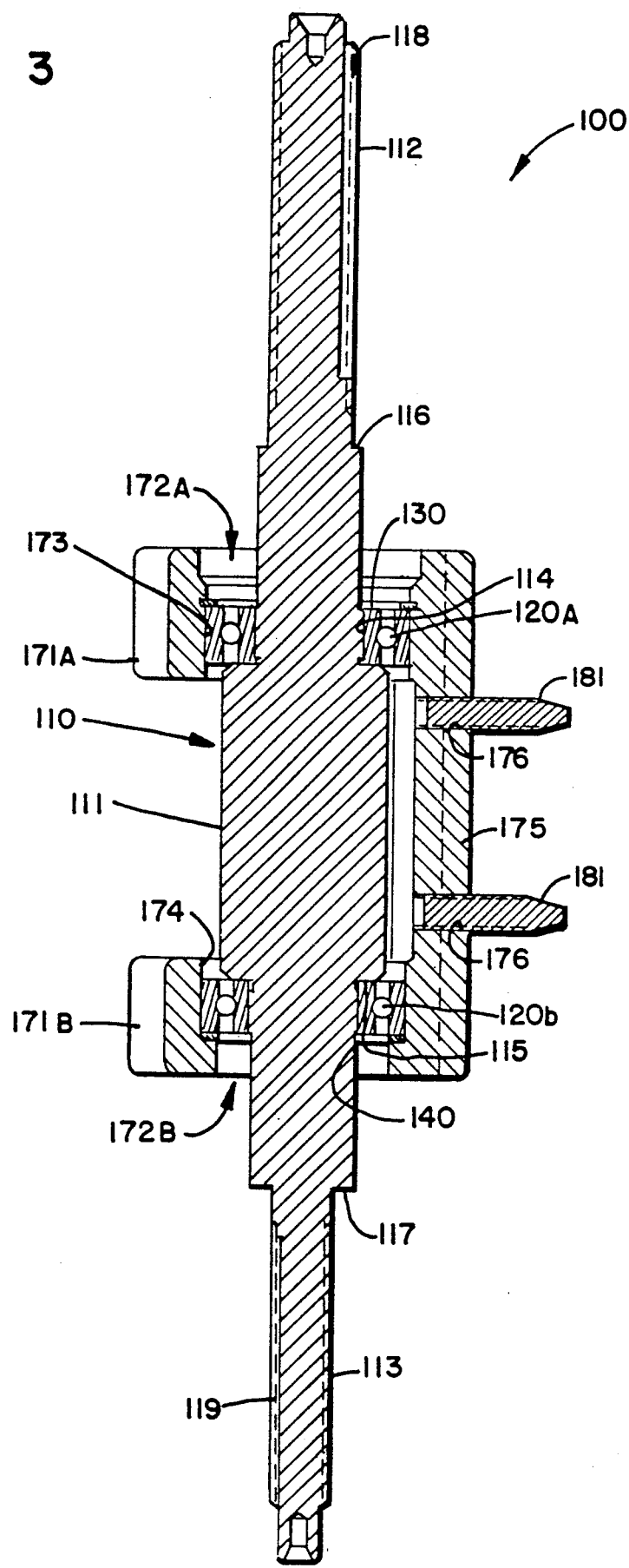
FIG. 3 is a cross-sectional view of the invention depicted in FIG. 2 taken along line 3—3.

Referring to FIGS. 1, 2 and 3, wherein the same reference numerals designate the same element in accordance with the nomenclature established above, the solid, dual arbor spindle 110 includes a longitudinally extending central cylinder section 111 from which a large diameter threaded arbor 112 extends in a first longitudinal direction and a small diameter threaded arbor 113 extends in a second longitudinal direction diametrically opposed to the large arbor 112.

The solid design of the spindle 110 provides the superior performance and cost efficiency associated with a solid spindle design while the dual arbor feature facilitates interchangeability as between the two arbors 112,113 on the spindle 110.

The diameter of the central cylinder section 111 is greater than the diameter of both the large 112 and small 113 arbors so as to define a first inner shoulder 114 at the junction of the large arbor 112 and the central section 111 of the spindle 110 and a second inner shoulder 115 at the junction of the small arbor 113 and the central section 111 of the spindle 110.

The arbors themselves 112,113 further define outer shoulders 116,117 proximate the central section 111 of the spindle 110.

The spindle 110 is rotatably retained within a spindle housing 170 with the central cylindrical section 111 of the spindle 110 longitudinally sandwiched between a pair of bearings 120a,120b. The bearings 120a,120b are confined in position against the inner shoulders 114,115 on the spindle 110 by a pair of longitudinally spaced retention rings 171a,171b which are interconnected by a connection brace 175.

The retention rings 171a,171b define central orifices 172a,172b which are sized to permit passage of the entire spindle 110 and bearings 120a,120b. Retention of the spindle 110 and bearings 120a,120b between the retention rings 171a,171b is achieved by (i) an inner annular flange 174 on the second retention ring 171b which reduces the diameter of the central orifice 172b extending completely through the second ring 171b such that the arbors 112,113 may extend through the central orifice 172b but the central section 111 of the spindle 110 and the associated bearing 120b are restrained by the flange 174, and (ii) a retaining ring 130 secured within an inner annular channel 173 in the first retention ring 171a which, as with the inner annular flange 174 on the second retention ring 171b, reduces the diameter of the central orifice 172a which extends completely through the first retention ring 171a such that the arbors 112,113 may extend through the central orifice 172a but the central section 111 of the spindle 110 and the associated bearing 120a are restrained by the retaining ring 130.

A wave washer 140 is provided between the inner annular flange 174 and the bearing 120b for causing the spindle 110 and bearings 120a,120b to retentively bear against the inner annular flange 174 and the retaining ring 130 and thereby reduce wobbling of the spindle 110 and bearings 120a,120b within the spindle housing 170.

Referring to FIG. 1, the spindle assembly 100 (spindle 110 and spindle housing 170) is positionably mounted upon a bracket assembly 200 by inserting the connecting brace 172 into an alignment channel 211 in the bracket 200 and bolting the spindle housing 170 to the bracket 200 by means of a pair of bolts 181 which pass through holes 176 in the connecting brace 172 and holes 212 in the bracket 200 and are then threaded upon a pair of nuts 182.

The connecting brace 172 and alignment channel 211 are preferably sized for snug retention of the brace 172 within the channel 211 so as to insure proper orientation of the spindle assembly 100 with respect to the bracket 200.

A belt channel 213 is provided in the bracket 200 proximate the alignment channel 211 to accommodate passage of a drive belt 380 from a motor (not shown) on the other side of the bracket 200 into contact with the central section 111 of the spindle 110 which acts as a pulley surface.

Referring to FIG. 3, longitudinal key slots 118,119 are provided on the large 112 and small 113 arbors respectively for temporarily mating with a longitudinal rib (not shown) in the work surface 920 for insuring proper longitudinal alignment of the spindle 110 with respect to the work surface 920.

Flat washers 150a,150b and nuts 160a,160b may be provided on the large 112 and small 113 arbors respectively for accommodating mounting of a cutting tool (not shown) onto the arbors 112,113.

Assembly

For the sole purpose of facilitating understanding of the steps involved in assembling the spindle assembly 100, assembly will assume that the spindle 110 is oriented with the large arbor 112 extending from the first retention ring 171a and the small arbor 113 extending from the second retention ring 171b.

Referring to FIG. 1, the spindle assembly 100 is assembled by (i) placing the wave washer 140 upon the inner annular flange 174 within the central orifice 172b defined by the second retention ring 171b, (ii) placing the second bearing 120b atop the wave washer 140, (i) inserting the spindle 110 into the spindle housing 170 through the central orifice 172a in the first retention ring 171a until the second inner shoulder 115 of the spindle 110 rests against the second bearing 120b with the small arbor 113 extending through the second bearing 120b and the wave washer 140, (iv) lowering the first bearing 120a over the large arbor 112 and into contact with the inner shoulder 114 on the spindle 110 within the central orifice 172a of the first retention ring 171a, (v) simultaneously forcing the spindle 110 towards the second retention ring 171b against the bias of the wave washer 140 and inserting the retaining ring 130 into the exposed annular channel 173 in the first retention ring, and (vi) permitting the wave washer 140 to bias the spindle 110 and bearings 120a,120b against the retaining ring 130 in the first retention ring 171a and the inner annular flange 174 in the second retention ring 171b.

Rotation of Arbors

Referring to FIG. 1, changing of the arbor 112,113 which operably extends through the work surface 920 includes the steps of (i) decreasing the tension of the belt 380 upon the spindle 110, (ii) removing the nuts 182 from the bolts 181 holding the spindle housing 170 to the bracket assembly 200, (iii) maneuvering the spindle assembly 100 [along with the bolts] from between the belt 380 and the bracket 200, (iv) rotating the spindle assembly 100 to alternate up./down positions of the arbors 112,113, (v) reinserting the rotated spindle assembly 100 within the alignment channel 211 with the power belt 380 around the central section 111 of the spindle 110, (vi) retightening the nuts 182 onto the bolts 181, and (vii) retensioning the drive belt 380.

The specification is provided to aid in a complete, nonlimiting understanding of the invention. Since many variations and embodiments of the invention may be created without departing from the spirit and scope of the invention, the scope of the invention resides in the claims hereinafter appended.

I claim:

1. A dual-arbor spindle, comprising:
   a central section providing a pulley surface,
   a first arbor extending from the central section in a first longitudinal direction, and
   a second arbor extending from the central section in a second longitudinal direction which is diametrically opposed to the first longitudinal direction,
   wherein the central section, first arbor and second arbor form a spindle which is of single piece construction.

2. The spindle of claim 1 wherein the spindle is machined from a single piece of steel.

3. The spindle of claim 1 wherein the first and second arbors have different diameters.

4. A spindle assembly comprising (i) the spindle of claim 1, and (ii) a spindle housing operable for rotatably retaining the spindle and permitting a power transmission belt to operably contact the pulley surface of the spindle.

5. The spindle assembly of claim 4 wherein the spindle housing is of a single piece construction.

6. The spindle assembly of claim 4 wherein the spindle housing comprises (i) a first retention member having an aperture configured and arranged for permitting unrestricted passage of the first arbor, (ii) a second retention member longitudinally spaced from the first retention member having an aperture configured and arranged for permitting unrestricted passage of the second arbor, and (iii) a longitudinally extending brace connecting the retention members so as to longitudinally align the apertures in the first and second retention members.

7. The spindle assembly of claim 4 wherein the aperture through the first retention member is configured and arranged to permit passage of the central section, the aperture through the second retention member is configured and arranged to prohibit passage of the central section, and the spindle assembly further comprises a means operably attachable to the first retention member for prohibiting passage of the central section through the aperture in the first retention member.

8. The spindle assembly of claim 4 wherein the first and second arbors include longitudinal grooves operable for mating with a longitudinal rib so as to ensure longitudinal alignment of the spindle with a table top.

* * * * *

UNITED STATES PATENT AND TRADEMARK OFFICE
CERTIFICATE OF CORRECTION

PATENT NO. : 5,045,033

DATED : September 3, 1991

INVENTOR(S) : Kenneth Kapton and Barry D. Wixey

It is certified that error appears in the above-identified patent and that said Letters Patent is hereby corrected as shown below:

In Column 1, line 34,
   delete "spindle" and substitute therefore--spindles--.

In Column 2, line 53,
   after the word "diameter" insert the word--(inch)--.

In Column 2, line 54,
   after the word "diameter" insert the word--(inch)--.

In Column 4, line 13,
   delete "(i)" and substitute therefore--(iii)--.

Signed and Sealed this

Sixteenth Day of February, 1993

*Attest:*

STEPHEN G. KUNIN

*Attesting Officer*   Acting Commissioner of Patents and Trademarks